(12) United States Patent
Watanabe et al.

(10) Patent No.: US 9,010,836 B2
(45) Date of Patent: Apr. 21, 2015

(54) PUSH-OUT DEVICE

(75) Inventors: Yasuhiro Watanabe, Yokosuka (JP); Kiyoshi Hokazono, Toyota (JP); Kosei Yoshino, Toyota (JP)

(73) Assignee: Nifco Inc., Yokohama-shi, Kanagawa (JP)

( * ) Notice: Subject to any disclaimer, the term of this patent is extended or adjusted under 35 U.S.C. 154(b) by 0 days.

(21) Appl. No.: 14/002,526

(22) PCT Filed: Feb. 13, 2012

(86) PCT No.: PCT/JP2012/053288
§ 371 (c)(1),
(2), (4) Date: Oct. 8, 2013

(87) PCT Pub. No.: WO2012/117839
PCT Pub. Date: Sep. 7, 2012

(65) Prior Publication Data
US 2014/0042768 A1    Feb. 13, 2014

(30) Foreign Application Priority Data
Mar. 2, 2011   (JP) .................................. 2011-045052

(51) Int. Cl.
*B60K 15/05* (2006.01)
*F16F 1/04* (2006.01)
*F16F 1/12* (2006.01)
*E05C 19/02* (2006.01)

(52) U.S. Cl.
CPC ................ *B60K 15/05* (2013.01); *F16F 1/047* (2013.01); *F16F 1/128* (2013.01); *E05C 19/022* (2013.01); *B60K 2015/053* (2013.01); *B60K 2015/0561* (2013.01); *B60K 2015/0576* (2013.01)

(58) Field of Classification Search
CPC ........................................................ B60K 15/05
USPC ...................... 296/97.22; 49/326; 312/319.2
See application file for complete search history.

(56) References Cited

U.S. PATENT DOCUMENTS

| | | | | |
|---|---|---|---|---|
| 3,336,842 A | * | 8/1967 | Adelt | ................................ 92/75 |
| 4,017,062 A | * | 4/1977 | Zwirner | ......................... 267/166 |
| 4,922,722 A | * | 5/1990 | Kazumoto et al. | ................... 62/6 |
| 5,836,638 A | * | 11/1998 | Slocum | ...................... 296/97.22 |
| 5,871,155 A | * | 2/1999 | Stockner et al. | ................. 239/92 |
| 6,145,762 A | * | 11/2000 | Orloff et al. | ................ 239/533.2 |
| 8,292,113 B2 | * | 10/2012 | Nakaya | .......................... 220/315 |

(Continued)

FOREIGN PATENT DOCUMENTS

| | | |
|---|---|---|
| JP | H07-332040 A | 12/1995 |
| JP | 2003-148531 A | 5/2003 |

(Continued)

OTHER PUBLICATIONS

Europe Patent Office, "Search Report for EP12752369.4," Feb. 26, 2015.

*Primary Examiner* — H Gutman
(74) *Attorney, Agent, or Firm* — Manabu Kanesaka

(57) ABSTRACT

A coil spring of a push-up device for pushing out a fuel lid in an open direction includes a large pitch portion and small pitch portion, which have different pitches. Therefore, when the fuel lid is being closed, the coil spring, which pushes a rod into a case, has an increase rate of an urging force at an initial stroke less than an increase rate of the urging force at a later stroke following the initial stroke.

7 Claims, 21 Drawing Sheets

(56) References Cited

U.S. PATENT DOCUMENTS 8,485,585 B2 * 7/2013 Taniguchi et al. ......... 296/97.22
2009/0139991 A1 6/2009 Nakaya

FOREIGN PATENT DOCUMENTS

| | | |
|---|---|---|
| JP | 2011-005945 A | 1/2011 |
| JP | 2011-005951 A | 1/2011 |

* cited by examiner

PUSH-OUT DEVICE

RELATED APPLICATIONS

The present application is National Phase of International Application No. PCT/JP2012/053288 filed Feb. 13, 2012, and claims priority from Japanese Applications No. 20011-045052 filed Mar. 2, 2011.

FIELD OF TECHNOLOGY

The present invention relates to a push-up device for pushing a fuel lid attached to an auto body openably and closably in an open direction.

BACKGROUND ART

Conventionally, as for the push-up device, for example, there is Patent Document 1. In the conventional technology, a spring, inserted through a lower side rod portion, elastically contracts inside a case, and urges a rotator toward a cam portion.

PRIOR ART DOCUMENT

Patent Document

Patent Document 1: Japanese Unexamined Patent Application Publication No. 2011-5945

DISCLOSURE OF THE INVENTION

Problems to be Solved by the Invention

In view of the aforementioned fact, the present invention provides a push-up device which controls flapping of the fuel lid when the fuel lid is being closed so as to improve operability.

Means for Solving the Problems

The first aspect of the present invention provides a push-up device comprising a tube-shaped case fixed to an auto body side facing a fuel lid; a rod slidably held inside the case, and protruding from an inside of the case so as to push out the fuel lid; an urging mechanism positioned between the case and the rod, and compressed by an elastic deformation inside the case so as to urge the rod in a direction protruding from the inside of the case; and a lock mechanism positioned between the case and the rod, and pushing the rod against an urging force of the urging mechanism so as to lock the rod in a retracted position of the case. The urging mechanism has an increase rate of the urging force at an initial stroke, which pushes the rod into the case, less than an increase rate of the urging force at a later stroke following the initial stroke.

In the aforementioned aspect, the urging mechanism positioned between the tube-shaped case fixed to the auto body side facing the fuel lid and the rod slidably held inside the case and protruding from the inside of the case so as to push out the fuel lid, is compressed by the elastic deformation inside the case so as to urge the rod in the direction protruding from the inside of the case. Also, the urging mechanism has the increase rate of the urging force at the initial stroke, which pushes the rod into the case, less than the increase rate of the urging force at the later stroke following the initial stroke. Consequently, when the fuel lid is being closed, and the fuel lid abuts against the push-up device, a reaction force of the urging mechanism of the push-up device, which pushes back the fuel lid, is small at an initial stage, and after that increases. As a result, when the fuel lid is being closed, flapping of the fuel lid caused by the fuel lid pushed back is controlled by the reaction force of the urging mechanism of the push-up device so as to improve operability.

As for a second aspect of the present invention, in the first aspect of the present invention, the urging mechanism may be a coil spring including a large pitch portion and a small pitch portion, which have different pitches.

In the aforementioned aspect, the urging mechanism is the coil spring including the large pitch portion and the small pitch portion, which have different pitches, so that one coil spring can be used for the urging mechanism so as to simplify a configuration.

As for a third aspect of the present invention, in the second aspect of the present invention, the small pitch portion may be formed in both end portions of the coil spring in a longitudinal direction.

In the aforementioned aspect, the small pitch portions formed in both end portions of the coil spring in the longitudinal direction abut against the case and the rod. Consequently, when the coil spring is compressed, both end portions of the coil spring in the longitudinal direction are difficult to curve relative to the longitudinal direction. As a result, a compression deformation of the whole coil spring stabilizes.

As for a fourth aspect of the present invention, in the second or third aspect of the present invention, in a state wherein the small pitch portion is compressed leaving an unlocking push-in amount of the rod, the lock mechanism may lock the rod in the retracted position of the case.

In the aforementioned aspect, in the state wherein the small pitch portion is compressed leaving the unlocking push-in amount of the rod, the lock mechanism locks the rod in the retracted position of the case. Consequently, in a lock state locking the rod in the retracted position of the case, the urging force of the coil spring increases so as to control the rod in the lock state and flapping of the fuel lid.

As for a fifth aspect of the present invention, in the first or second aspect of the present invention, the lock mechanism may be a cam type lock mechanism, in which a cam operates by pushing the rod in so as to switch between locking and unlocking.

In the aforementioned aspect, the lock mechanism is the cam type lock mechanism, and by pushing the rod in, the cam operates so as to switch between the locking and the unlocking. Consequently, a switchover between the locking and the unlocking is ensured.

Effect of the Invention

The first aspect of the present invention has the aforementioned configuration, so that when the fuel lid is being closed, the flapping of the fuel lid can be controlled so as to improve the operability.

The second aspect of the present invention has the aforementioned configuration, so that when the fuel lid is being closed, the flapping of the fuel lid can be controlled with a simple configuration so as to improve the operability.

The third aspect of the present invention has the aforementioned configuration, so that the compression deformation of the coil spring stabilizes.

The fourth aspect of the present invention has the aforementioned configuration, so that the rod in the lock state and the flapping of the fuel lid can be controlled.

The fifth aspect of the present invention has the aforementioned configuration, so that the switchover between the locking and the unlocking can be ensured.

BEST MODES OF CARRYING OUT THE INVENTION (First Embodiment)

Next, according to FIG. 1 to FIG. 23, the first embodiment of a push-up device of the present invention will be explained.

Figure 4:
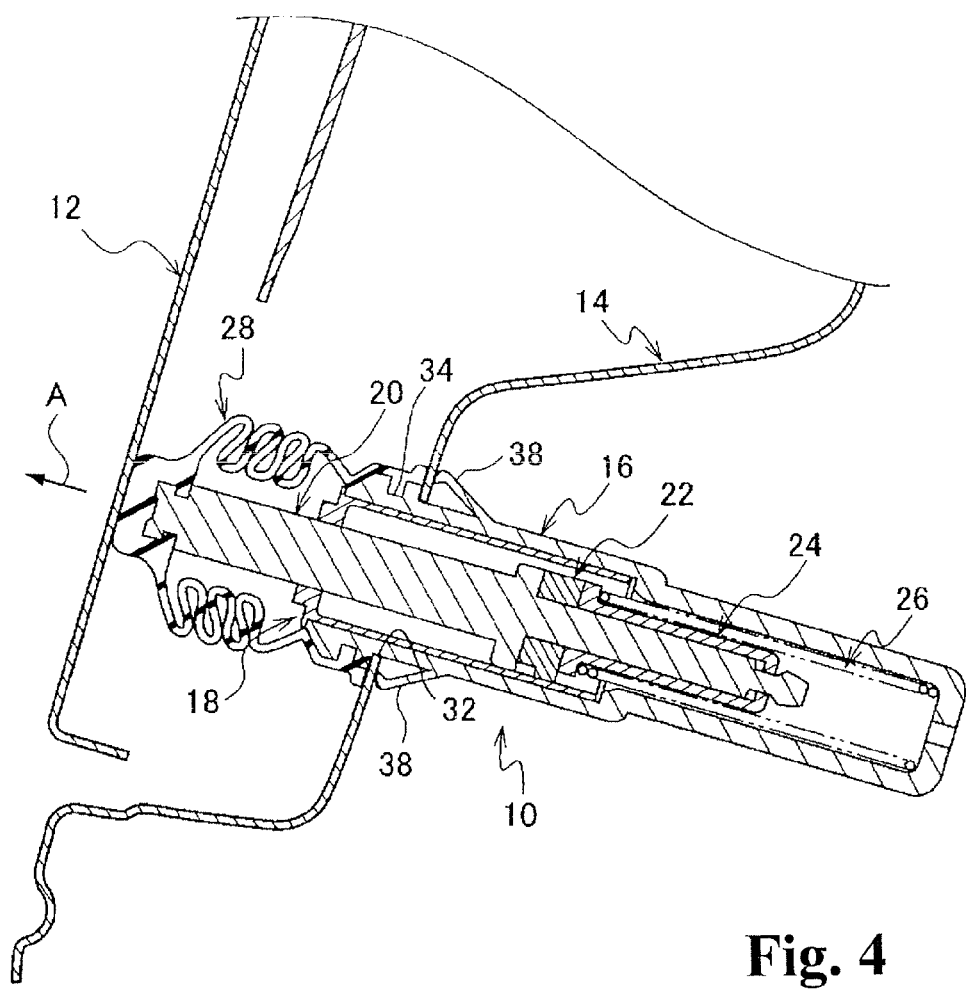
FIG. 4 is a cross-sectional view showing an attachment state of the push-up device according to the first embodiment of the present invention relative to an auto body.

As shown in FIG. 4, a push-up device 10 of the present embodiment is provided in, for example, an inner panel 14 (an auto body) as the auto body facing a fuel lid 12, and the fuel lid 12 attached to the inner panel 14 openably and closably is pushed out in an open direction (an arrow A direction in FIG. 4) by the push-up device 10.

Figure 1:
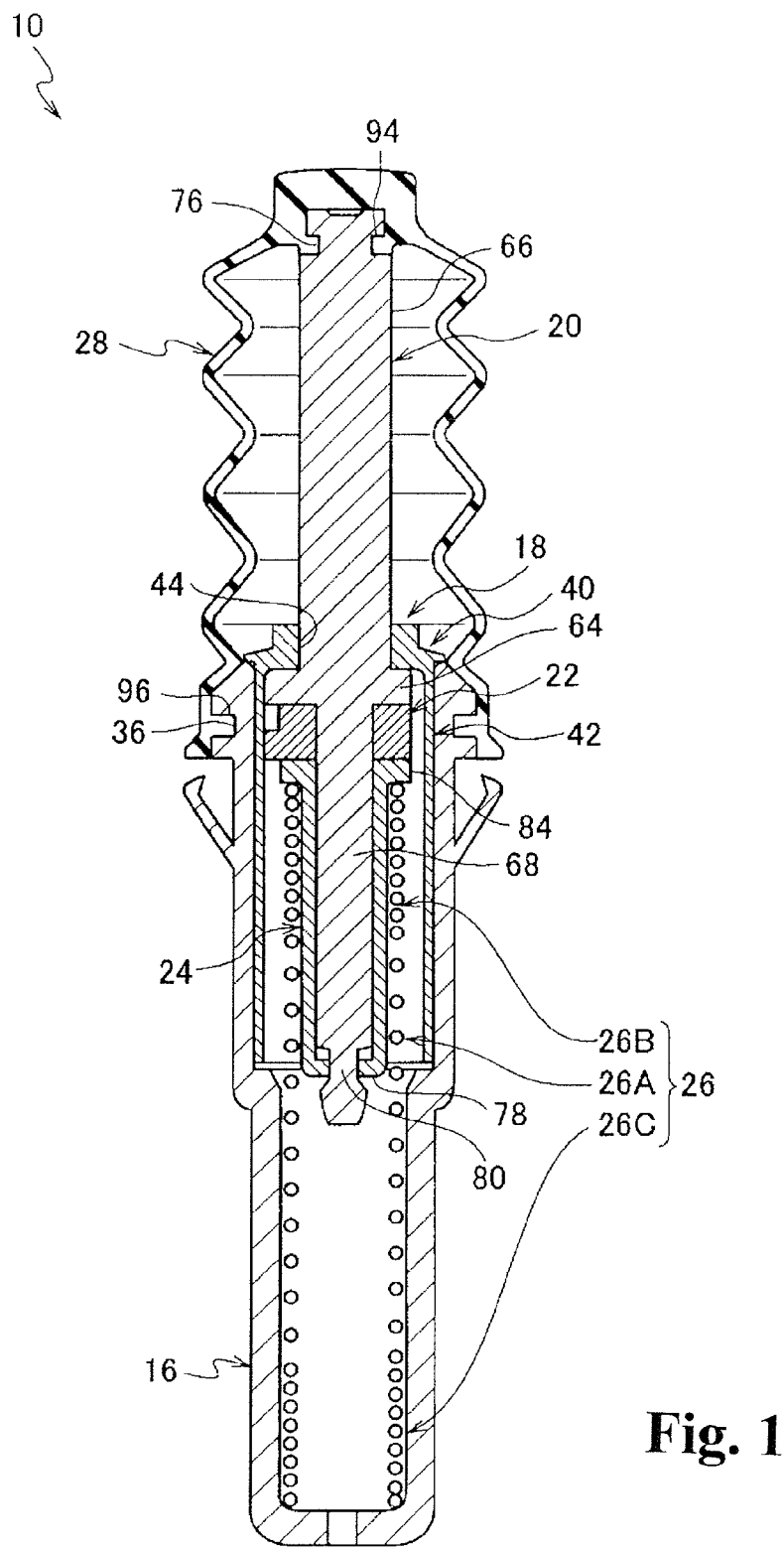
FIG. 1 is a cross-sectional view showing a push-up device according to the first embodiment of the present invention.

As shown in FIG. 1, the push-up device 10 comprises a case 16; a cap 18; a rod 20; a rotator 22; a sleeve 24; a coil spring 26 (an urging mechanism) as the urging mechanism; a boot 28; and the later-described lock mechanism. Incidentally, parts of the push-up device 10 are not limited to the aforementioned parts.

(Case)

Figure 5:
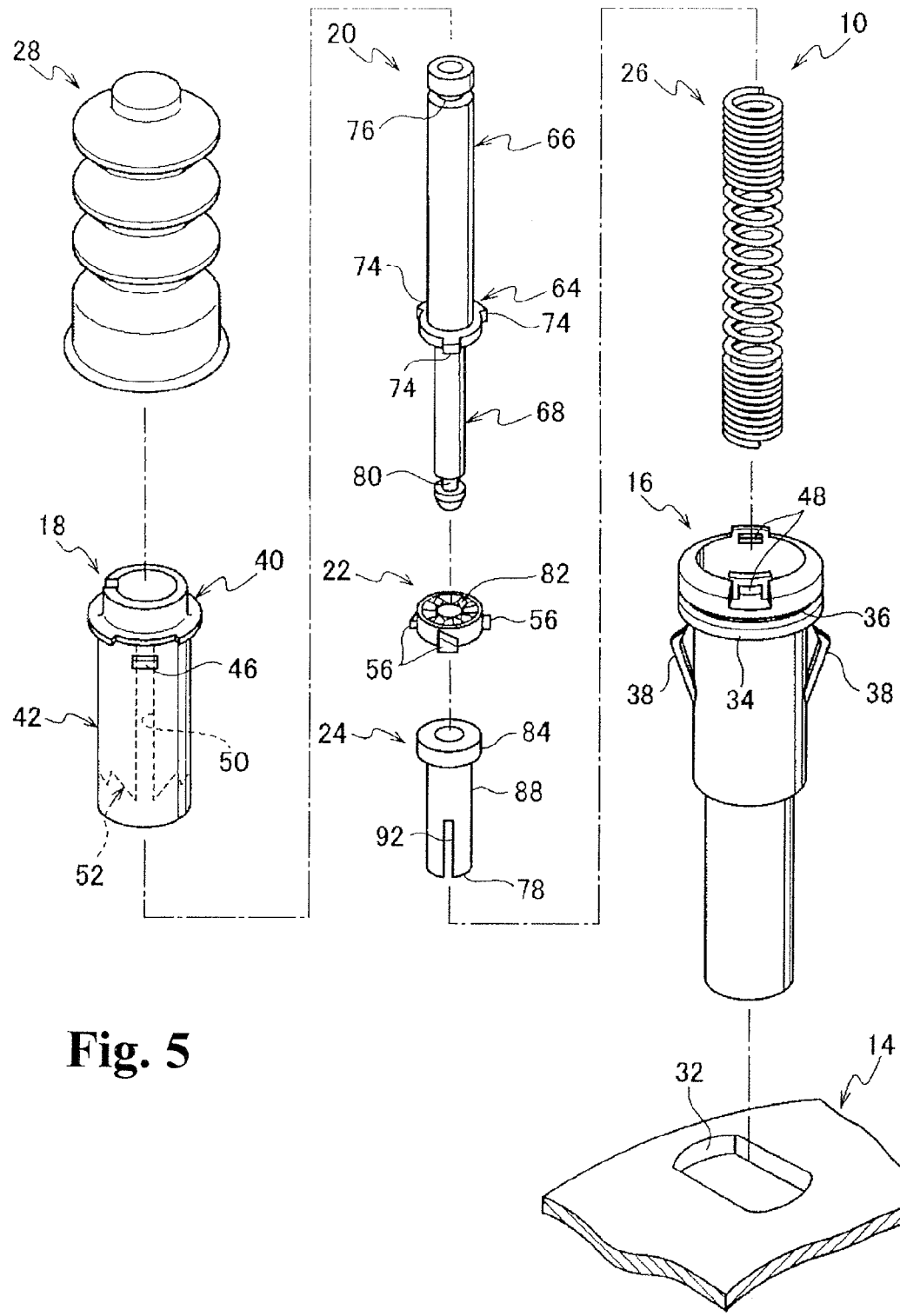
FIG. 5 is an exploded perspective view showing the attachment state of the push-up device according to the first embodiment of the present invention relative to the auto body.

As shown in FIG. 5, the case 16 is formed in a tube shape. Also, in the inner panel 14, there is formed a rectangular attachment hole 32 penetrating front and back surfaces. The case 16 is fixed into the attachment hole 32.

Figure 11:
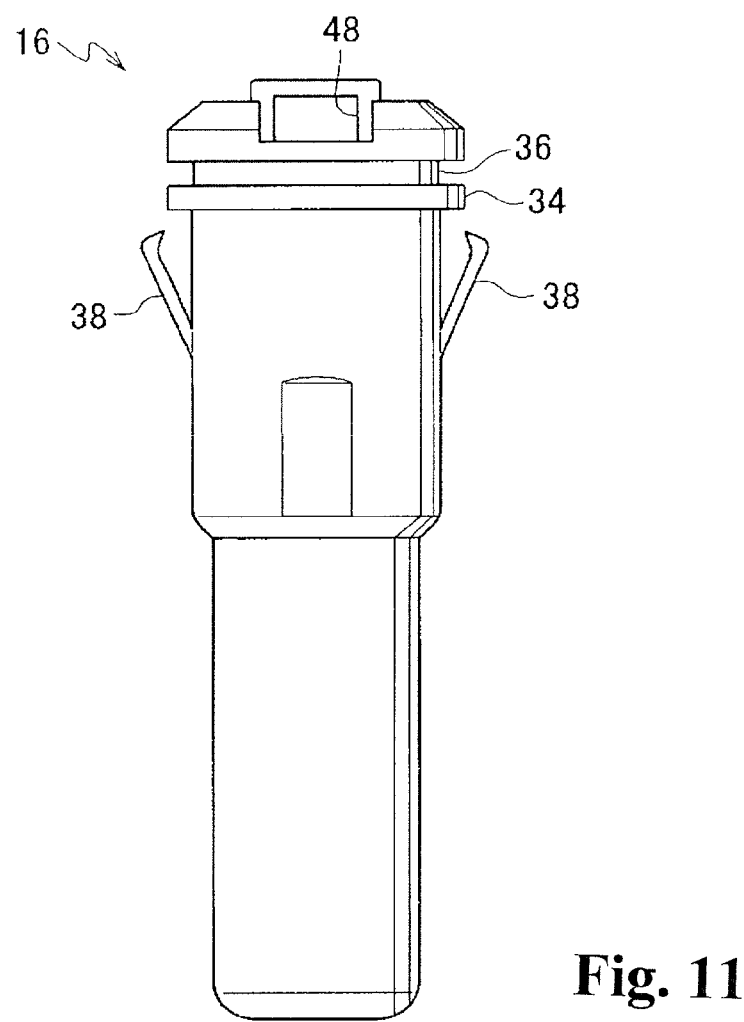
FIG. 11 is a side view showing a case of the push-up device according to the first embodiment of the present invention.
Figure 12:
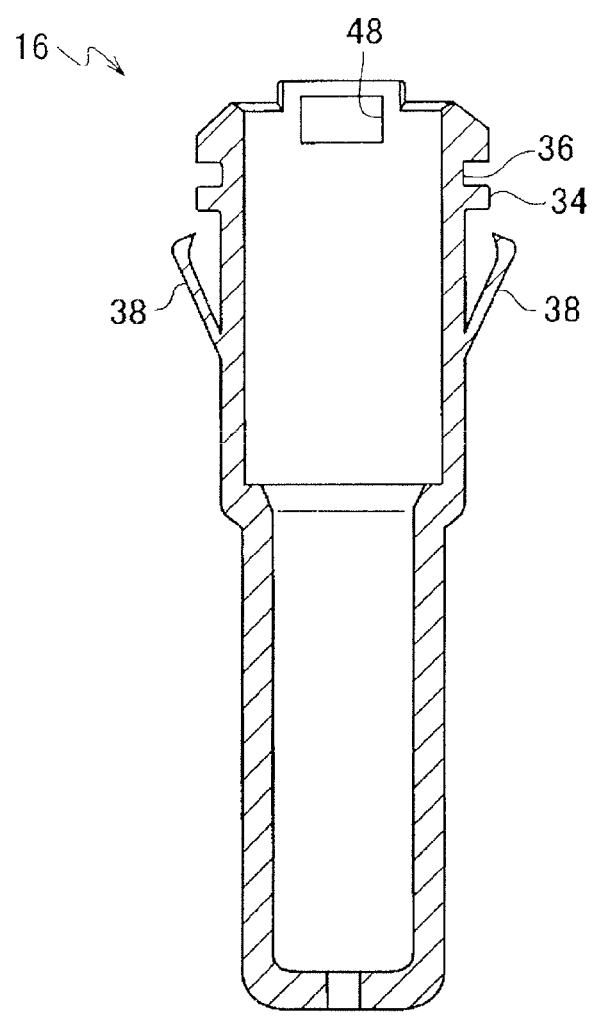
FIG. 12 is a sectional side view showing the case of the push-up device according to the first embodiment of the present invention.

As shown in FIG. 11 and FIG. 12, the case 16 is formed in a cylindrical shape whose upper surface is open, and forms a bottom surface. Also, an outer diameter of the case 16 is set in an inner diameter of the attachment hole 32 of the inner panel 14 or less. On an opening side end portion of the case 16, there is formed a flange portion 34 projecting outward in a radial direction. On an upper side of the flange portion 34, there is formed an annular attachment concave portion 36 to which the boot 28 is attached. Also, on a lower side of the flange portion 34, there is formed a plurality of pieces, for example, two pieces of elastic claws 38 protruding to allow an elastic deformation, in a radial fashion from an outer circumference of the case 16. The elastic claws 38 are separated from a lower surface of the flange portion 34 by keeping a distance of a thickness of the inner panel 14.

As shown in FIG. 4, when the case 16 is matched and fitted into the attachment hole 32, the elastic claws 38 recede once, and then, the elastic claws 38 elastically return at a back surface side of the inner panel 14, and clamp the inner panel 14 between the elastic claws 38 and the lower surface of the flange portion 34, so that the case 16 is fixed to the attachment hole 32.

(Cap)

As shown in FIG. 1, the cap 18 is attached to an opening upper surface of the case 16.

Figure 13:
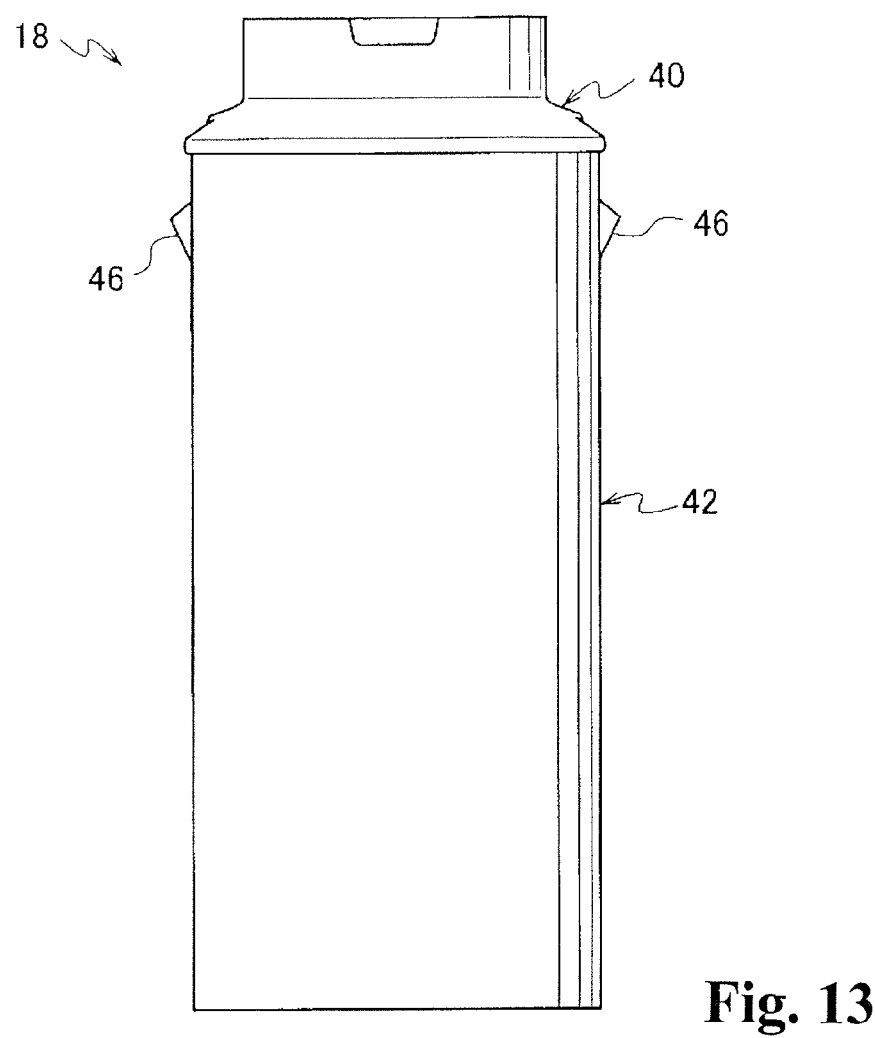
FIG. 13 is a side view showing a cap of the push-up device according to the first embodiment of the present invention.
Figure 14:
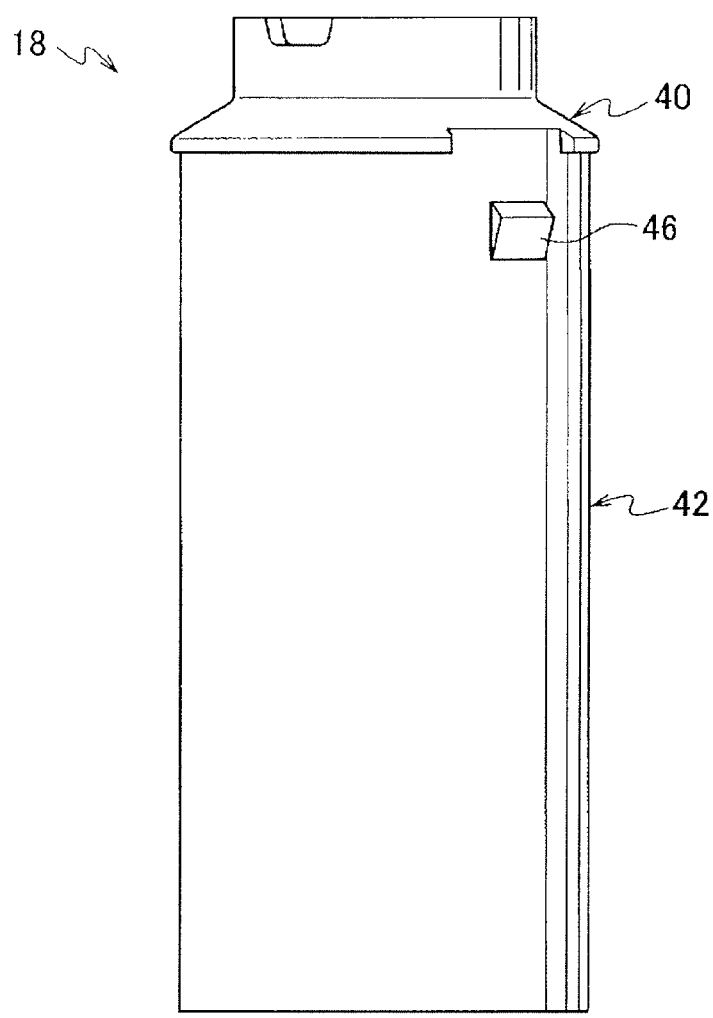
FIG. 14 is a side view showing the cap of the push-up device according to the first embodiment of the present invention viewed from another direction.

As shown in FIG. 13 and FIG. 14, the cap 18 includes a lid portion 40 slightly larger than the opening upper surface of the case 16; and a cylindrical portion 42 extending in a cylindrical shape slenderizing one step from a lower surface of the lid portion 40.

Figure 15:
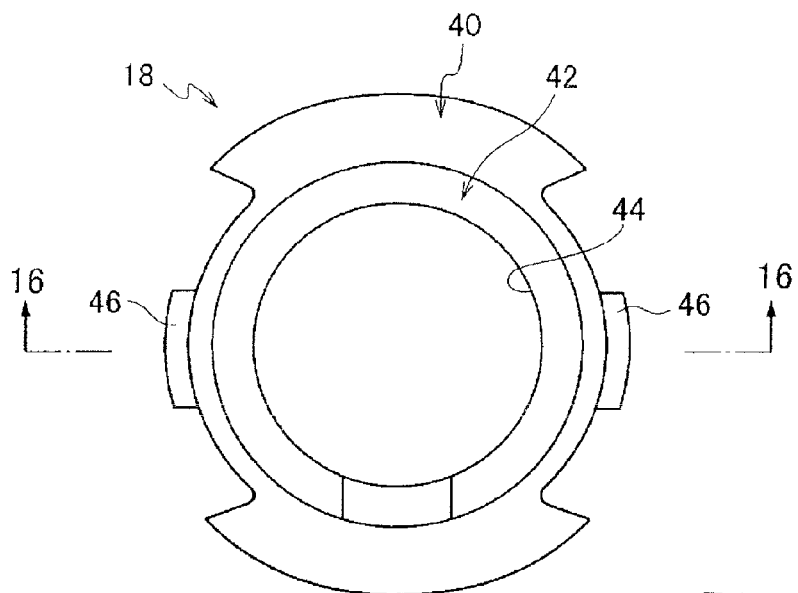
FIG. 15 is a plan view showing the cap of the push-up device according to the first embodiment of the present invention.
Figure 16:
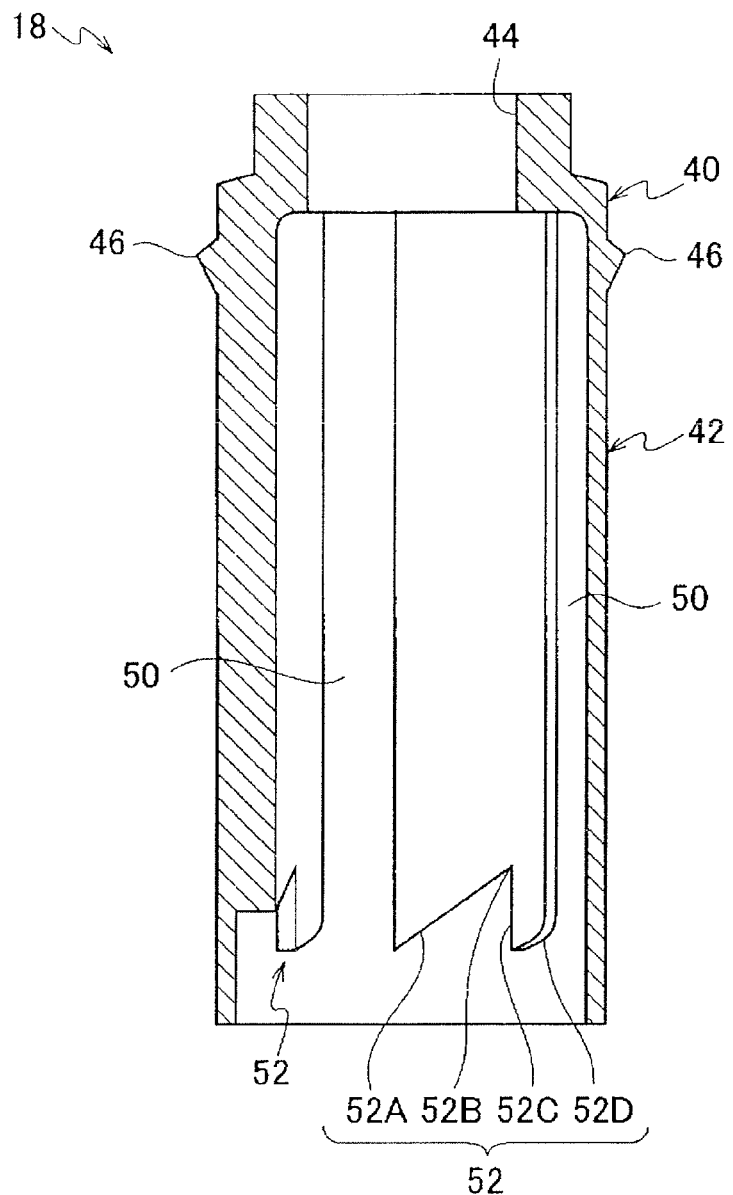
FIG. 16 is a cross-sectional view taken along a cross-sectional line 16-16 in FIG. 15.

As shown in FIG. 15 and FIG. 16, in the lid portion 40 of the cap 18, there is formed a circular through-hole 44 penetrating up and down, and the rod 20 is inserted to pass through the through-hole 44.

As shown in FIG. 1, an outer circumference of the cylindrical portion 42 of the cap 18 is set in an inner diameter of the case 16 or less, and the cylindrical portion 42 of the cap 18 is inserted into the case 16.

As shown in FIG. 13 to FIG. 16, in a portion adjacent to the lid portion 40 on the outer circumference of the cylindrical portion 42 of the cap 18, there is formed a plurality of pieces, for example, two pieces of locking claws protruding to allow an elastic deformation, in a radial fashion.

As shown in FIG. 11 and FIG. 12, near the attachment concave portion 36 of the case 16, there are formed locking holes 48 penetrating in and out, and the locking claws 46 of the cap 18 are fitted in the locking holes 48 of the case 16.

Therefore, when the cylindrical portion 42 of the cap 18 is matched and fitted into the opening upper surface of the case 16, the locking claws 46 recede once, and then, the locking claws 46 elastically fit into the locking holes 48, so that the cap 18 is fixed to the case 16.

As shown in FIG. 16, on an inner circumferential surface of the cylindrical portion 42 of the cap 18, there is formed a slide groove 50 (the lock mechanism) provided to be concaved. The slide groove 50 holds the rod 20 slidably and non-rotatably. Incidentally, the slide groove 50 is formed with a plurality of pieces, for example, three pieces, and an upper end portion of the slide groove 50 is dead-end, and a lower end portion of the slide groove 50 is open. On a lower side of the slide groove 50, there is formed a lock groove 52 (the lock mechanism) provided to be concaved on an inner circumferential surface of the cylindrical portion 42, and the lock groove 52 locks the rotator 22 non-rotatably. Also, the lock groove 52 is formed inside an interval of adjacent slide grooves 50, and is formed in a serrated shape along a circumferential direction of the inner circumferential surface of the cylindrical portion 42.

As shown in FIG. 8A to FIG. 10B, based on one slide groove 50, the lock groove 52 includes a first slope face portion 52A facing a front in a rotational direction (an arrow B direction in FIGS. 8B, 9B, and 10B) of the rotator 22 from the slide groove 50, and inclining upward; a lock portion 52B positioned in a slope upper end portion of the first slope face portion 52A, i.e., the front in the rotational direction of the rotator 22, and into which an engagement protrusion 56 (the lock mechanism) of the later-described rotator 22 is fitted; a vertical portion 52C steeply downward from the lock portion 52B; and a second slope face portion 52D inclining upward from a lower end portion of the vertical portion 52C, and wherein a slope upper end portion faces another slide groove 50 positioned in the front in the rotational direction of the rotator 22.

Also, a slope lower end portion of the first slope face portion 52A, i.e., a back in the rotational direction of the rotator 22, faces one slide groove 50. Incidentally, inclination angles of the first slope face portion 52A and the second slope face portion 52D correspond.

(Rod)

As shown in FIG. 1, the rod 20 is slidably held inside the case 16, and protrudes from the inside of the case 16 so as to push out the fuel lid 12.

Figure 17:
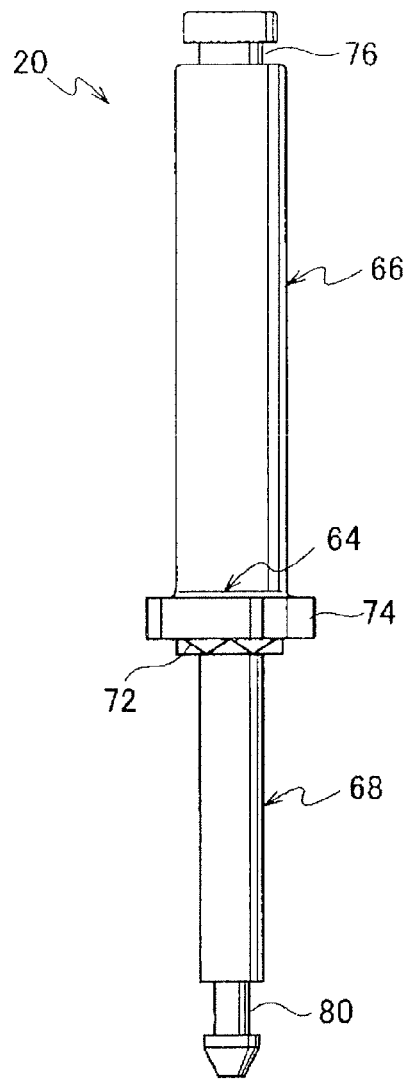
FIG. 17 is a side view showing the rod of the push-up device according to the first embodiment of the present invention.
Figure 18:
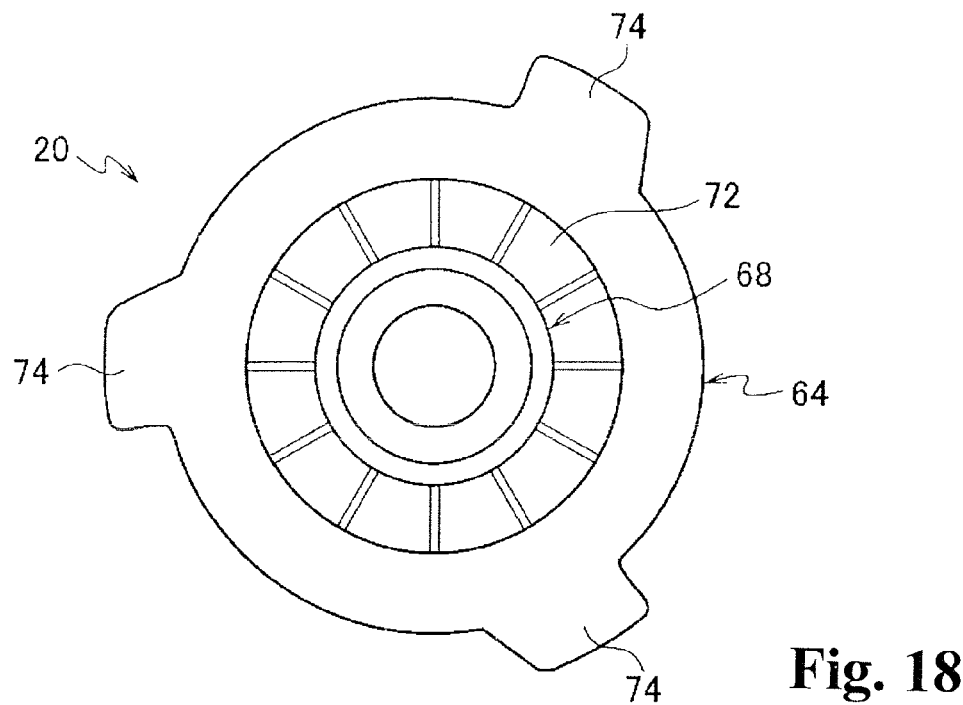
FIG. 18 is a bottom view showing the rod of the push-up device according to the first embodiment of the present invention.

As shown in FIG. 17 and FIG. 18, the rod 20 includes a cam portion 64 (the lock mechanism) formed in a columnar shape, positioned in an intermediate portion in an axis direction, and protruding outward in a radial direction; an upper side rod portion 66 positioned on an upper side of the cam portion 64, and protruding from the inside of the case 16 so as to push out the fuel lid 12; and a lower side rod portion 68 positioned on a lower side of the cam portion 64, and inserting the coil spring 26 through.

On a lower surface of the cam portion 64, there is formed a stationary side cam 72 engaging with a movable side cam surface 70 of the later-described rotator 22. The stationary side cam 72 is formed continuously along a circumferential direction of the lower surface of the cam portion 64, and is formed in an obtuse-angled wave-tooth shape. Also, on an outer circumference of the cam portion 64, there is formed a slide protrusion 74 (the lock mechanism) protruding with a plurality of pieces, for example, three pieces in a radial fashion.

The slide protrusion 74 of the rod 20 fits into the slide groove 50 of the cap 18, and rises and falls along the slide groove 50, so that the rod 20 is held inside the cap 18 slidably and non-rotatably.

As shown in FIG. 1 and FIG. 17, in an upper end portion of the upper side rod portion 66 of the rod 20, there is formed an annular groove 76 to which the boot 28 is attached. Also, in a lower end portion of the lower side rod portion 68 of the rod 20, there is formed a slenderizing constricted portion 80 in which a reduced diameter portion 78 of the later-described sleeve 24 fits.

As shown in FIG. 1, a height of the constricted portion 80 of the rod 20 is set higher than a thickness in an up-and-down direction of the reduced diameter portion 78 of the sleeve 24. Consequently, in a state wherein the reduced diameter portion 78 is fitted in the constricted portion 80, a clearance is generated in a height direction of the constricted portion 80. Consequently, the reduced diameter portion 78 of the sleeve 24 can rise and fall up and down only for a clearance portion of the constricted portion 80 of the rod 20.

Incidentally, a clearance amount is set according to rising and falling amounts of the rotator 22 rising and falling between a first height position wherein a movable side cam portion 82 of the later-described rotator 22 is engaged with the stationary side cam 72 of the cam portion 64, and a second height portion wherein the movable side cam portion 82 of the rotator 22 is disengaged from the stationary side cam 72.

(Sleeve)

Figure 22:
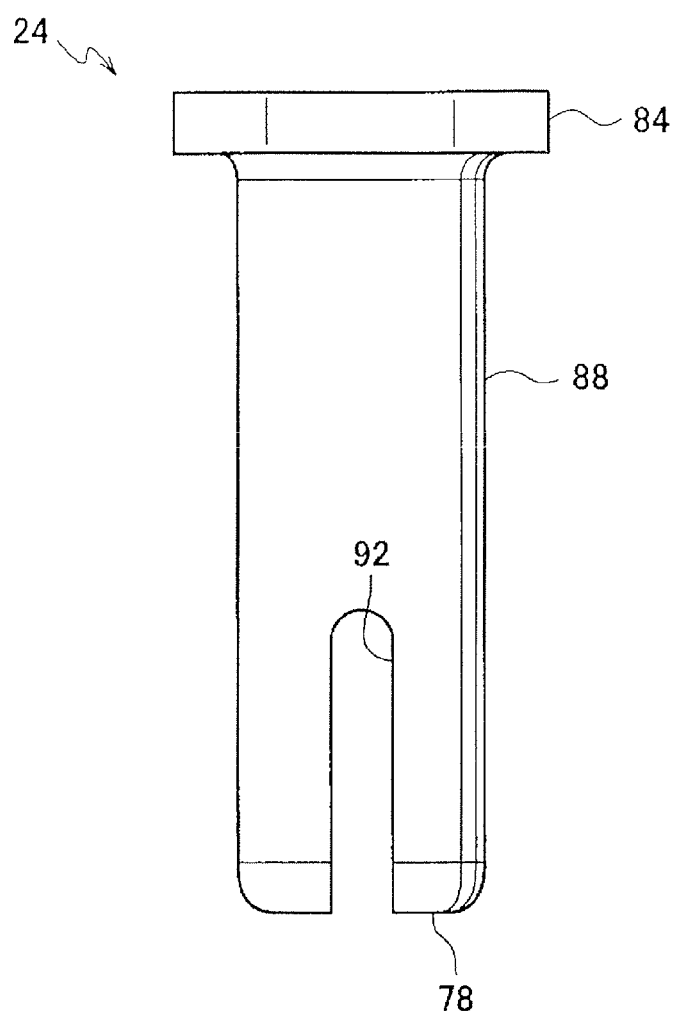
FIG. 22 is a side view showing the sleeve of the push-up device according to the first embodiment of the present invention.
Figure 23:
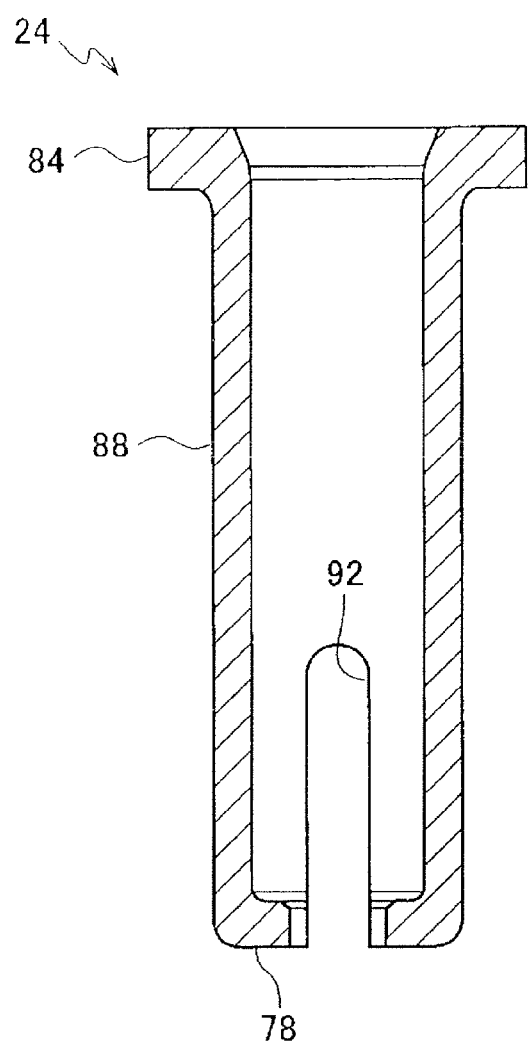
FIG. 23 is a cross-sectional view showing the sleeve of the push-up device according to the first embodiment of the present invention.

As shown in FIG. 22 and FIG. 23, the sleeve 24 includes a sleeve main body 88, a projecting portion 84, the reduced diameter portion 78, and a slit 92.

As shown in FIG. 1 and FIG. 5, the sleeve 24 is inserted through the lower side rod portion 68 of the rod 20, and is positioned between the rotator 22 and the coil spring 26. Also, in a lock position of the lock mechanism, the sleeve 24 restricts a movement in a slide direction of the rod 20.

Figure 7:
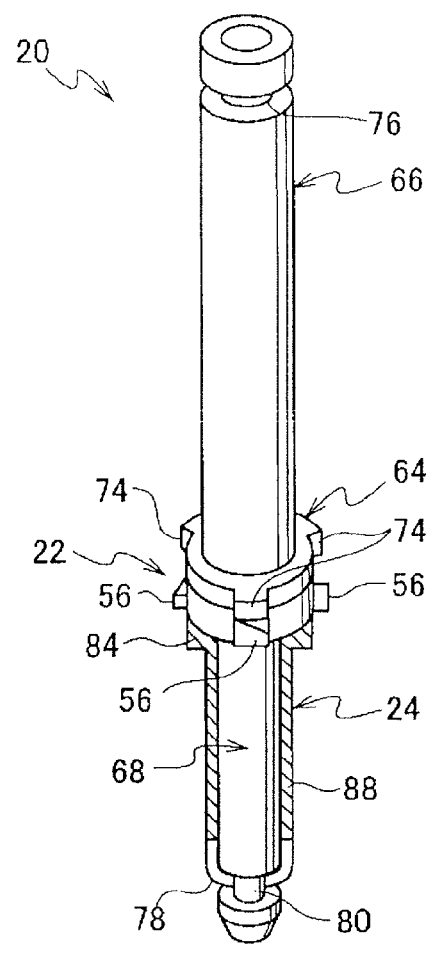
FIG. 7 is a perspective view showing an assembly state among the rod, the rotator, and a sleeve of the push-up device according to the first embodiment of the present invention with the sleeve in a cross section.

As shown in FIG. 7, the sleeve main body 88 of the sleeve 24 is formed in a tube shape, and is inserted through the lower side rod portion 68. Also, the projecting portion 84 of the sleeve 24 is positioned in an upper end portion of the sleeve main body 88 abutting against the rotator 22, and projects outward in a radial direction.

As shown in FIG. 23, the reduced diameter portion 78 of the sleeve 24 is positioned in a lower end portion of the sleeve main body 88 on a side opposite to the upper end portion, and annularly protrudes internally in the radial direction. In the slit 92, the lower end portion of the sleeve main body 88 is cut and divided into a plurality, for example, two. The slit 92 is formed with a pair in a diametrical direction of the sleeve main body 88, and is formed upward to the middle from an end surface of a lower side of the sleeve main body 88. Incidentally, although the slit 92 is formed with, for example, a pair, the slit 92 may be formed with three pieces or above.

Incidentally, the sleeve 24 restricts the movement in the slide direction of the rod 20 in a lock position wherein the rod 20 is shortened. Namely, in a state wherein the stationary side cam 72 of the rod 20 and the movable side cam portion 82 of the later-described rotator 22 are engaged, the sleeve 24 prevents the rod 20 from wobbling in a direction wherein the stationary side cam 72 and the movable side cam portion 82 are separated from each other, i.e., in an up-and-down direction.

(Coil Spring)

As shown in FIG. 1, the coil spring 26 is positioned between the case 16 and the rod 20, and in a state wherein the rotator 22 and the sleeve 24 are inserted through the lower side rod portion 68 of the rod 20, the coil spring 26 is compressed between the projecting portion 84 of the sleeve 24 and a bottom of the case 16, and urges the rod 20 toward a direction protruding from the inside of the case 16. Also, the coil spring 26 elastically contracts inside the case 16, and urges the rotator 22 toward the cam portion 64 of the rod 20.

Figure 2:
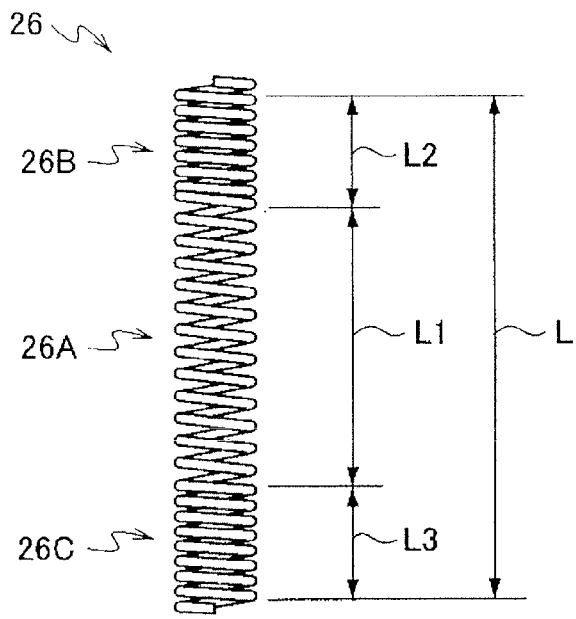
FIG. 2 is a side view showing a coil spring of the push-up device according to the first embodiment of the present invention.

As shown in FIG. 2, the coil spring 26 is an irregular-pitch coil spring having a large pitch portion 26A and small pitch portions 26B and 26C, which have different pitches. Also, the small pitch portion 26B and the small pitch portion 26C of the coil spring 26 are formed on both end portions in a longitudinal direction of the coil spring 26, and an intermediate portion in the longitudinal direction of the coil spring 26 becomes the large pitch portion 26A.

Incidentally, a relationship of each length in an entire length L of the coil spring 26, a length L1 of the large pitch portion 26A, a length L2 of the small pitch portion 26B, and a length L3 of the small pitch portion 26C is shown as one example of L=L1+L2+L3, L1>L2=L3.

Figure 3:
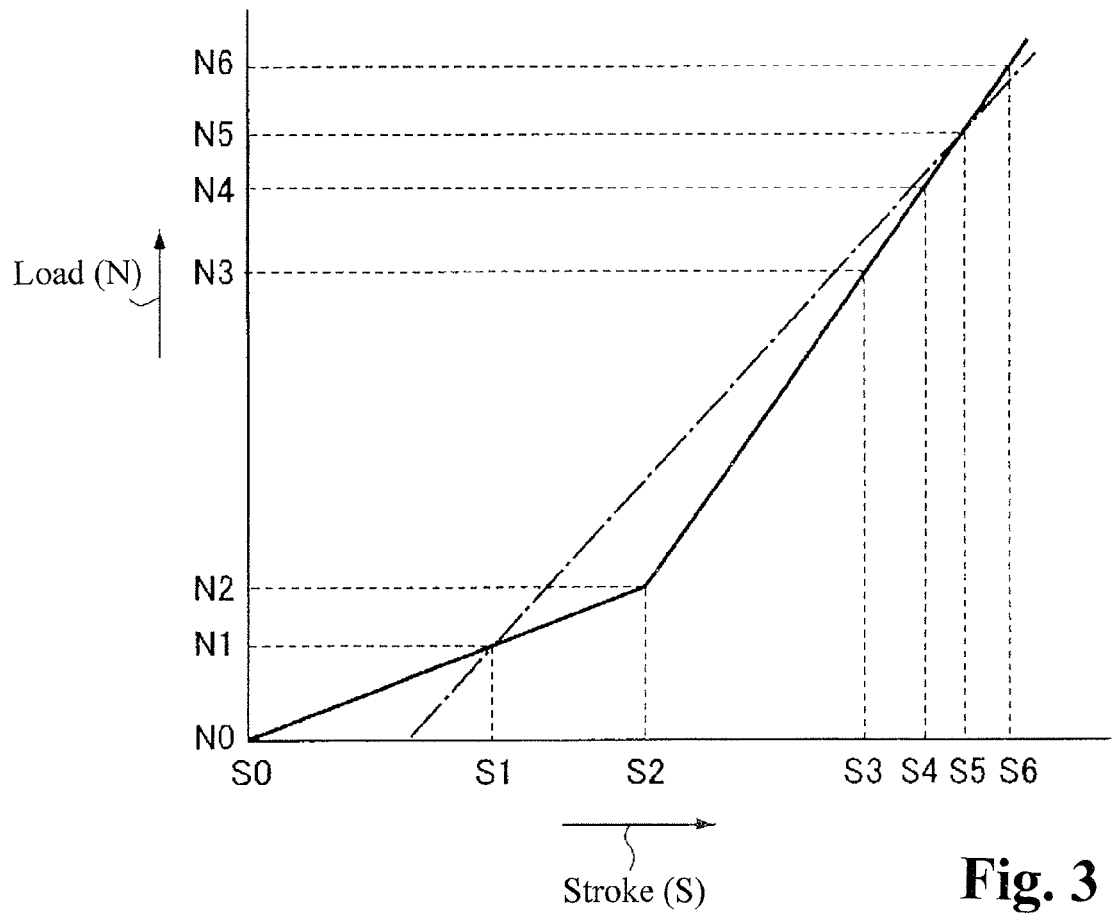
FIG. 3 is a graph showing a relationship between a stroke and a load in the coil spring of the push-up device according to the first embodiment of the present invention.

Therefore, a relationship between a stroke (hereinafter, described as S) and a load (hereinafter, described as N) of the coil spring 26 is shown in FIG. 3.

As shown in FIG. 3, relative to a load (N=N0) in a free length (S=S0) of the coil spring 26, S=S1 and N=N1 in a state wherein the push-up device 10 is attached to the auto body, and the fuel lid 12 is open.

Also, in a case of closing the fuel lid 12, when the fuel lid 12 abuts against the push-up device 10, a ratio (N2−N1)/(S2−S1) of an increase (N2−N1) of the load at an initial stroke (S2−S1) that the rod 20 is pushed into the case 16, is reduced compared to a ratio (N6−N2)/(S6−S2) of an increase (N6−N2) of the load at a later stroke (S6−S2) following the initial stroke (S2−S1).

Consequently, a ratio of an increase of an urging force by the coil spring 26 is reduced compared to an increase rate of the urging force at the later stroke (S6−S2) following the initial stroke (S2−S1).

Incidentally, in FIG. 3, S3 shows a stroke in a state wherein the fuel lid 12 is closed, and N3 shows a load in that state. Also, S4 shows a stroke when the push-up device 10 is locked, and N4 shows a load in that state. Also, S5 shows a stroke when the push-up device 10 is unlocked, and N5 shows a load in that state. Also, the S6 shows a maximum overstroke of the push-up device 10, and the N6 shows the load in that state. Furthermore, a graph shown with dashed lines in FIG. 3 shows a relationship between a stroke and a load of a regular-pitch coil spring.

Also, in a state wherein the coil spring 26 is compressed, and the small pitch portions 26B and 26C, which are compressed following the large pitch portion 26A, are compressed leaving an unlocking push-in amount (S5−S4) of the rod 20, i.e., in a state wherein the small pitch portions 26B and 26C of the coil spring 26 are nearly attached firmly, the rod 20 is locked in a retracted position of the case 16 by the lock mechanism.

(Lock Mechanism)

Figure 6:
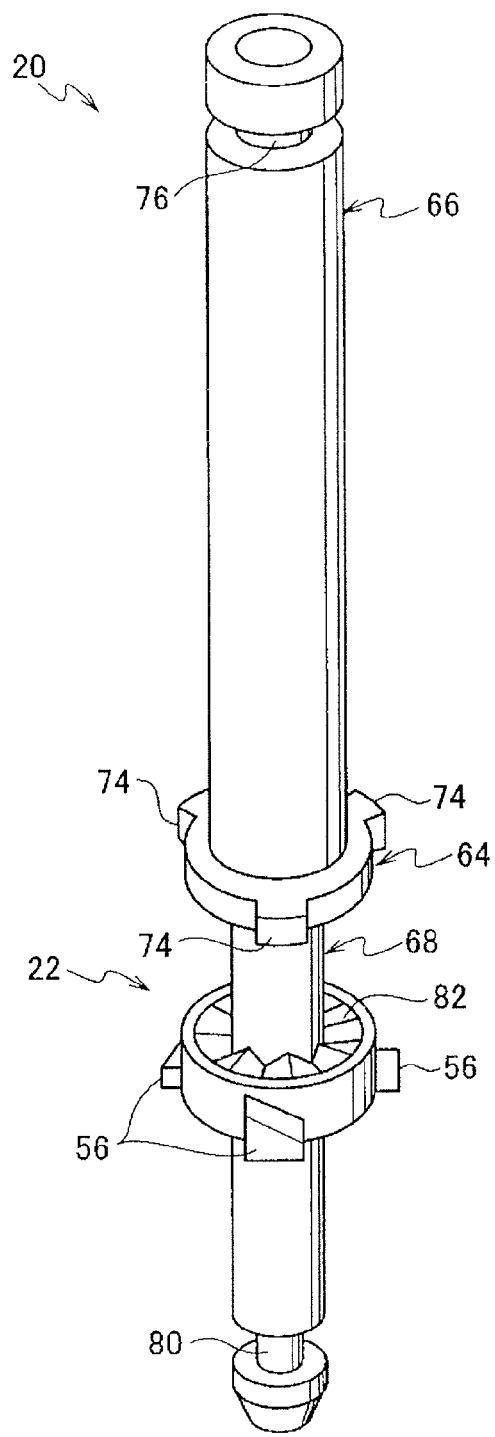
FIG. 6 is a perspective view showing an assembly state between a rod and a rotator of the push-up device according to the first embodiment of the present invention.

As shown in FIG. 6, the lock mechanism is a rotating cam type including the rotator 22, and is positioned between the case 16 and the rod 20. The lock mechanism locks the rod 20 in the retracted position of the case 16 against the urging force of the coil spring 26. Also, the rotator 22 is supported in the lower side rod portion 68 of the rod 20 rotatably, and slidably in the axis direction, and includes the movable side cam portion 82 which engages with the stationary side cam 72 of the cam portion 64, disengages from the stationary side cam 72 of the cam portion 64 by a slide of the rod 20, and provides a rotational force in one direction.

Figure 19:
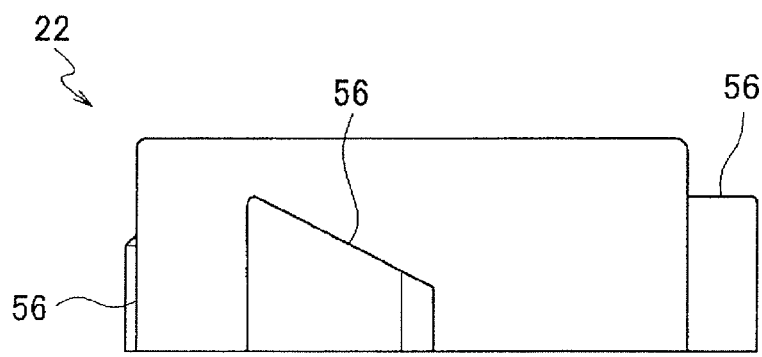
FIG. 19 is a side view showing the rotator of the push-up device according to the first embodiment of the present invention.
Figure 20:
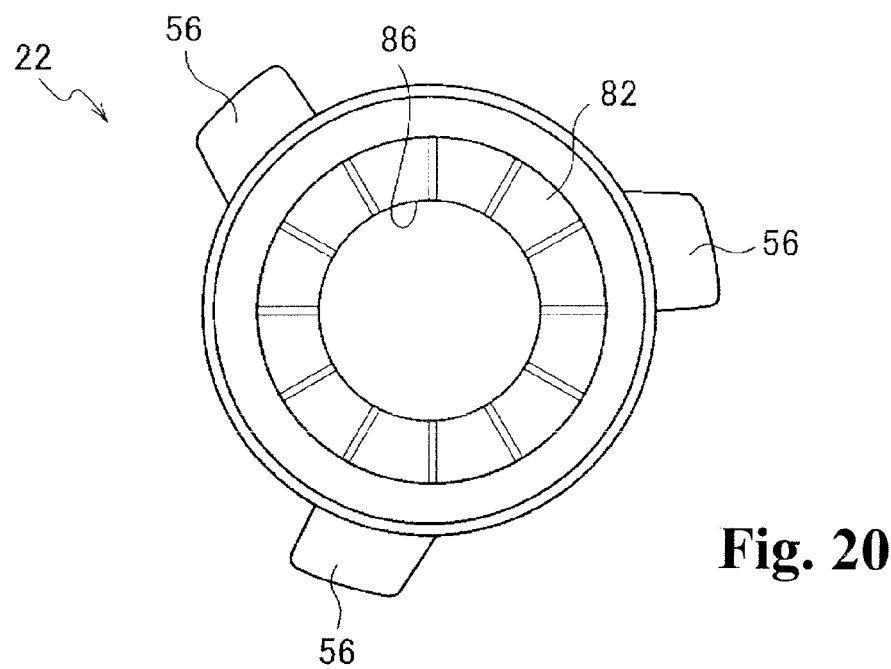
FIG. 20 is a plan view showing the rotator of the push-up device according to the first embodiment of the present invention.
Figure 21:
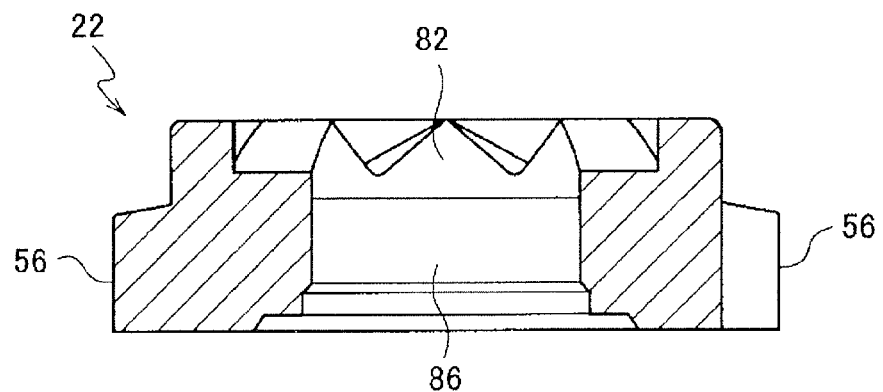
FIG. 21 is a cross-sectional view showing the rotator of the push-up device according to the first embodiment of the present invention.

As shown in FIG. 19 to FIG. 21, the rotator 22 is formed in a doughnut shape. Also, as shown in FIG. 20 and FIG. 21, the rotator 22 includes a center hole 86 penetrating up and down in the center, and inserting the lower side rod portion 68 of the rod 20 to pass through; and the movable side cam portion 82 formed in an upper surface, engaging with the stationary side cam 72 of the cam portion 64 of the rod 20, disengaging from the stationary side cam 72 of the cam portion 64 by the slide of the rod 20, and providing the rotational force in one direction. The movable side cam portion 82 forms a complementary. shape to a shape of the stationary side cam 72 of the cam portion 64 of the rod 20, and is formed continuously along a circumferential direction of the upper surface of the rotator 22, and in an obtuse-angled wave-tooth shape. Also, on an outer circumference of the movable side cam portion 82, there is formed the engagement protrusion 56 protruding with a plurality of pieces, for example, three pieces in a radial fashion.

Figure 10A:
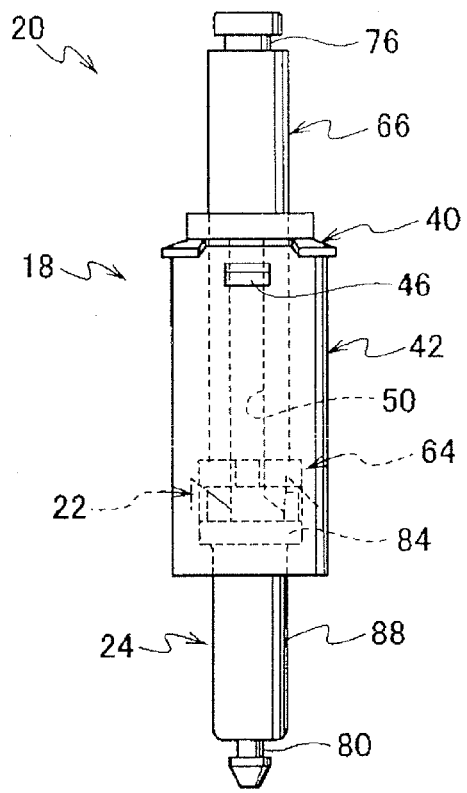
FIG. 10A is an explanatory drawing showing a lock state of the lock mechanism corresponding to FIG. 8A.
Figure 10B:
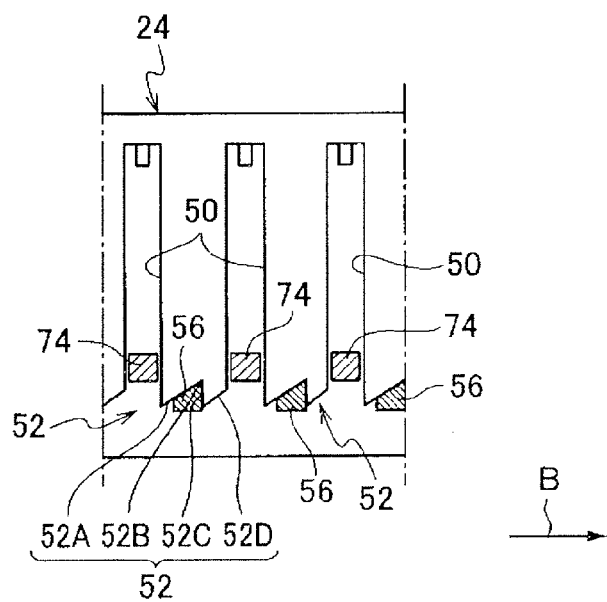
FIG. 10B is an explanatory drawing showing the lock state of the lock mechanism corresponding to FIG. 8B.

As shown in FIG. 10B, a flat surface of the engagement protrusion 56 of the rotator 22 is formed in a trapezoidal shape having a slope face on the upper surface, and the engagement protrusion 56 of the rotator 22 is fitted in the lock portion 52B of the lock groove 52 of the cap 18. Also, the slope face of trapezoidal shape of the engagement protrusion 56 of the rotator 22 corresponds to the inclination angles of the first slope face portion 52A and the second slope face portion 52D of the lock groove 52.

Figure 8A:
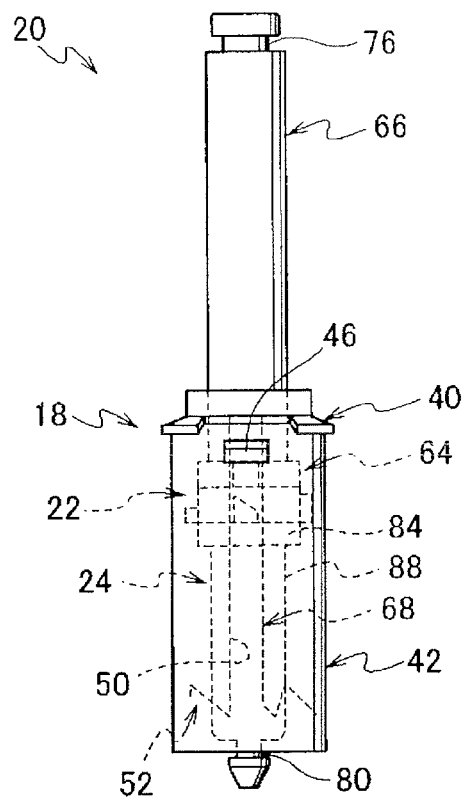
FIG. 8A is an explanatory drawing for explaining a movement of a lock mechanism of the push-up device according to the first embodiment of the present invention.
Figure 8B:
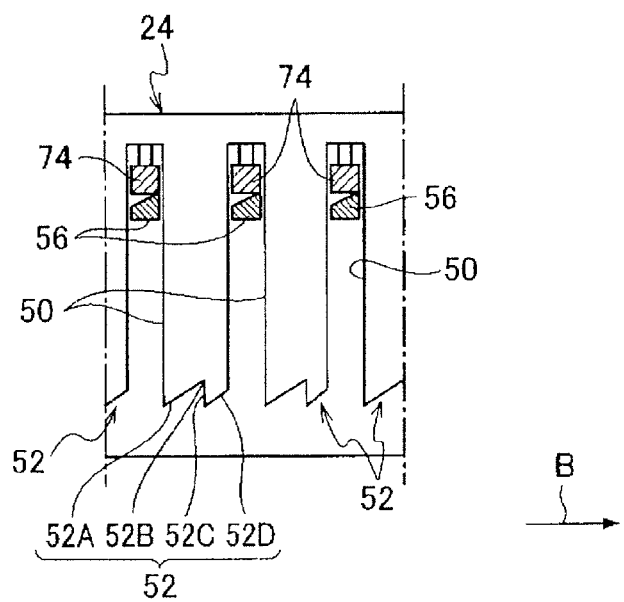
FIG. 8B is an explanatory drawing for explaining the movement of the lock mechanism of the push-up device according to the first embodiment of the present invention.

As shown in FIG. 8B, a lateral width in a right-and-left direction of the engagement protrusion 56 of the rotator 22 is set in a right-and-left groove width of the slide groove 50 of the cap 18 or less so as to slide the slide groove 50.

Therefore, in the present embodiment, in addition to the engagement protrusion 56 of the rotator 22, and the lock groove 52 of the cap 18, the cam portion 64 and the slide protrusion 74 of the rod 20, and the slide groove 50 of the cap 18 function as one composing element of the lock mechanism as well.

(Boot)

As shown in FIG. 1, the boot 28 is elastic, covers the upper side rod portion 66 protruding from the case 16, and is attached to the case 16. The boot 28 is formed in a hollow bellows shape whose lower surface is open, and an upper end portion is closed in a saclike manner. On an inner circumferential surface of the upper end portion of the boot 28, there is formed an annular protrusion 94 annularly protruding internally in the radial direction, and the annular protrusion 94 is fitted in the annular groove 76 of the rod 20. Also, on an inner circumferential surface of an opening lower surface of the boot 28, there is formed an annular convex portion 96 annularly protruding internally in the radial direction. The annular convex portion 96 is fitted in the attachment concave portion 36 of the case 16.

(Operation and Effect)

Next, an operational effect of the push-up device 10 of the present embodiment will be explained.

As shown in FIG. 4, in an assembled state of the push-up device 10, the case 16 is matched and fitted into the attachment hole 32 of the inner panel 14 so as to be fixed to the inner panel 14. Also, as shown in FIG. 10A, in the state wherein the fuel lid 12 is closed, the push-up device 10 is locked in a lock state wherein the rod 20 is shortened.

Figure 9A:
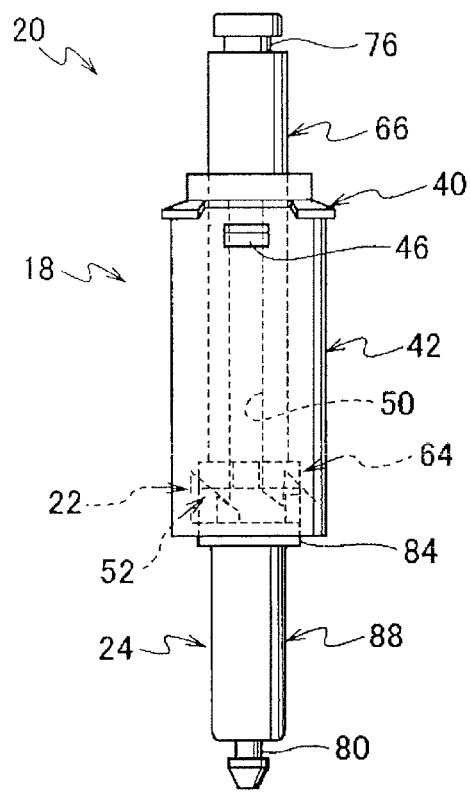
FIG. 9A is an explanatory drawing showing a state wherein the rod is pushed in corresponding to FIG. 8A.

Next, as shown in FIG. 9A, when the fuel lid 12 in the closed state is pushed in, the rod 20 of the push-up device 10 is pushed into the case 16 so as to release the lock state. As a result, as shown in FIG. 8A, due to a compression restoring force of the coil spring 26, the rod 20 protrudes from the inside of the case 16 so as to push the fuel lid 12 to open. Consequently, the fuel lid 12 which has been pushed to open can be easily opened by hand.

Figure 9B:
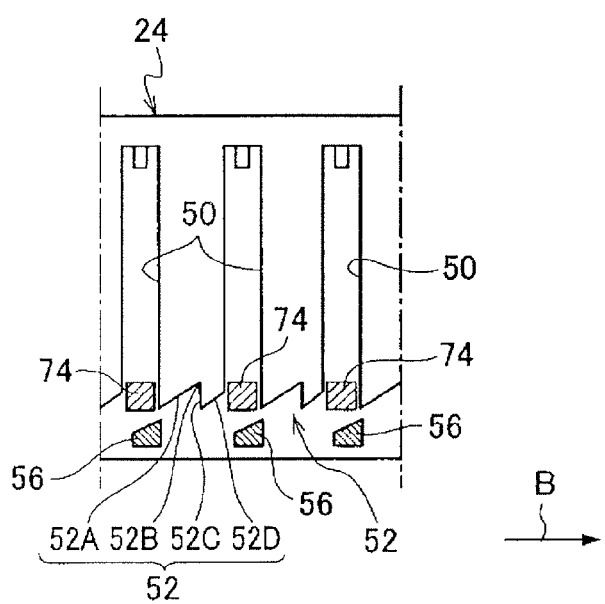
FIG. 9B is an explanatory drawing showing the state wherein the rod is pushed in corresponding to FIG. 8B.

More specifically, as shown in FIG. 10B, in the lock state wherein the rod 20 is shortened, the engagement protrusion 56 of the rotator 22 and the lock groove 52 of the cap 18 are engaged so as to be fitted in the lock portion 52B. In that state, when the rod 20 is pushed into the case 16, the rotator 22 is pushed by the cam portion 64 of the rod 20 so as to descend. Consequently, as shown in FIG. 9B, the engagement protrusion 56 of the rotator 22 is disengaged from the lock portion 52B of the cap 18. At that time, an engagement between the stationary side cam 72 of the cam portion 64 of the rod 20 and the movable side cam portion 82 of the rotator 22 is disengaged, so that the rotator 22 rotates in the arrow B direction. Next, when a force pushing the rod 20 in is released, the rotator 22 is pushed up by the compression restoring force of the coil spring 26. At that time, the engagement protrusion 56 of the rotator 22 abuts against the second slope face portion 52D of the cap 18. Consequently, the engagement protrusion 56 ascends while slidingly contacting the second slope face portion 52D, and as shown in FIG. 8B, the engagement protrusion 56 fits in the slide groove 50 from a slope face upper end portion of the second slope face portion 52D.

As shown in FIG. 8B, when the engagement protrusion 56 fits in the slide groove 50, the engagement protrusion 56 can ascend along the slide groove 50. Consequently, due to the compression restoring force of the coil spring 26, the cam portion 64 of the rod 20 is pushed up through the rotator 22, and the rod 20 protrudes from the case 16 so as to extend.

On the other hand, when the open fuel lid 12 is closed by hand, the fuel lid 12 abuts against the push-up device 10, and the extended rod 20 is pushed toward the case 16 against the urging force of the coil spring 26, so that the engagement protrusion 56 of the rotator 22 descends along the slide groove 50.

At that time, in the present embodiment, as shown in FIG. 2, the coil spring 26 includes the large pitch portion 26A and the small pitch portions 26B and 26C, which have different pitches.

Consequently, as shown in FIG. 3, the ratio (N2−N1)/(S2−S1) of the increase (N2−N1) of the load at the initial stroke (S2−S1) that the rod 20 is pushed into the case 16, is reduced compared to the ratio (N6−N2)/(S6−S2) of the increase (N6−N2) of the load at the later stroke (S6−S2) following the initial stroke (S2−S1). As a result, the ratio of the increase of the urging force by the coil spring 26 is reduced compared to the increase rate of the urging force at the later stroke (S6−S2) following the initial stroke (S2−S1).

Therefore, when the fuel lid 12 abuts against the push-up device 10, a reaction force of the coil spring 26 pushing the fuel lid 12 back is small at an initial stage, and after that increases. Consequently, when the fuel lid 12 abuts against the push-up device 10, flapping of the fuel lid 12 caused by the fuel lid 12 pushed back is controlled by the reaction force of the coil spring 26 so as to improve operability. As a result, a closing operation of the fuel lid 12 with a feeling of a high grade can be obtained.

Next, when the rod 20 is further pushed toward the case 16 against the urging force of the coil spring 26; the engagement protrusion 56 of the rotator 22 descends along the slide groove 50; and the engagement protrusion 56 comes out of an opening lower end of the slide groove 50, the rotator 22 can rotate. Consequently, due to a disengagement of the engagement between the stationary side cam 72 and the movable side cam portion 82, the rotator 22 rotates in the arrow B direction in FIG. 9B, and moves toward the first slope face portion 52A of the lock groove 52 from the lower side of the slide groove 50.

Next, when the force pushing the rod 20 in is released, the rotator 22 is pushed up by the compression restoring force of the coil spring 26. At that time, the engagement protrusion 56 abuts against the first slope face portion 52A. Consequently, the engagement protrusion 56 ascends while slidingly contacting the first slope face portion 52A, and as shown in FIG. 10B, the engagement protrusion 56 fits in the lock portion 52B so as to return to the lock state again.

Thus, in the present embodiment, the lock mechanism is a rotating cam type lock mechanism, and by pushing the rod 20 in, a rotating cam operates so as to switch between the locking and the unlocking. Consequently, a switchover between the locking and the unlocking is ensured.

Also, in the present embodiment, one coil spring 26 including the large pitch portion 26A and the small pitch portions 26B and 26C is used as the urging mechanism so as to simplify a configuration. As a result, a cost increase can be controlled.

Also, in the present embodiment, the small pitch portions 26B and 26C formed in both end portions in the longitudinal direction of the coil spring 26 abut against the case 16 and the rod 20. Consequently, when the coil spring 26 is compressed, both the end portions in the longitudinal direction of the coil spring 26 are difficult to curve relative to the longitudinal direction. As a result, a compression deformation of the whole coil spring 26 stabilizes.

Also, in the present embodiment, in the state wherein the coil spring 26 is compressed, and the small pitch portions 26B and 26C, compressed following the large pitch portion 26A, are compressed leaving the unlocking push-in amount (S5−S4) of the rod 20, i.e., in the state wherein the small pitch portions 26B and 26C of the coil spring 26 are nearly attached firmly, the lock mechanism locks the rod 20 in the retracted position of the case 16. Consequently, the urging force of the coil spring 26 in the lock state wherein the rod 20 is locked in the retracted position of the case 16 increases so as to control the rod 20 in the lock state and the flapping of the fuel lid 12.

(Another Embodiment)

Figure 24:
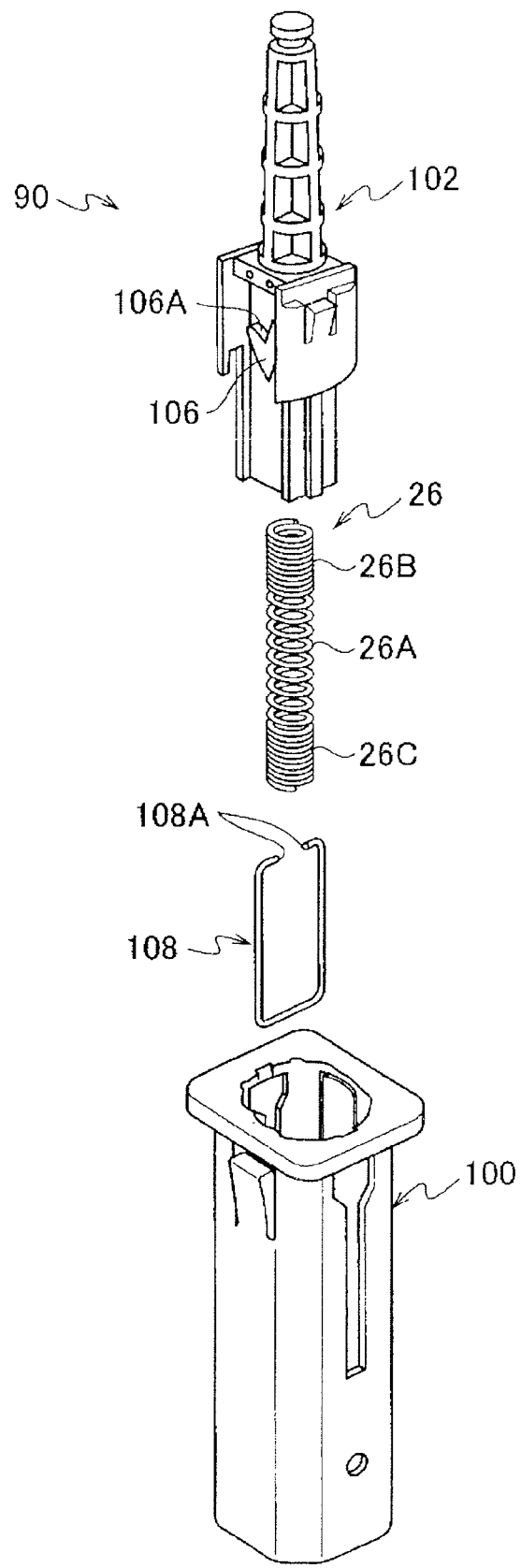
FIG. 24 is an exploded perspective view showing the push-up device according to a second embodiment of the present invention.

Although the specific embodiment of the present invention has been explained in detail hereinabove, the present invention is not limited to the aforementioned embodiment, and it is obvious for those skilled in the art to have other various embodiments within a range of the present invention. For example, as in a case of a push-up device 90 of a second embodiment shown in FIG. 24, a rod 102 is pushed into a case 100, so that an end portion 108A of a control spring 108 moves along a heart-shaped control cam 106, and the end portion 108A of the control spring 108 is locked at a concave portion 106A of a control cam 106 so as to become a lock state. The rod 102 is pushed into the case 100 again, so that the end portion 108A of the control spring 108 comes out of the concave portion 106A of the control cam 106 so as to release the lock state. Using as it is called a heart cam type push-up device (a push-up device described in German Patent No. 19650594A1 and the like), there may be used a configuration using the coil spring 26 of the first embodiment as the urging mechanism urging the rod 102 in a direction protruding from an inside of the case 100.

Also, each embodiment described hereinabove has a configuration in which the small pitch portions 26B and 26C of the coil spring 26 are formed in both end portions in the longitudinal direction of the coil spring 26, and the intermediate portion in the longitudinal direction of the coil spring 26 is the large pitch portion 26A. However, provided that the coil spring 26 forms a small pitch portion and a large pitch portion, which have different pitches, the number or positions of the small pitch portion and the large pitch portion are not limited to each embodiment described hereinabove.

Also, by partially changing a width or a material of the coil spring 26, for example, by widening the small pitch portions 26B and 26C of the coil spring 26 compared to a width of the large pitch portion 26A, or by strengthening an elastic force of a material forming the small pitch portions 26B and 26C of the coil spring 26 compared to an elastic force of a material forming the large pitch portion 26A, there may be a configuration wherein the increase rate of the urging force at the initial stroke, which pushes the rod into the case, is reduced compared to an increase rate of the urging force at the later stroke following the initial stroke.

Also, in each embodiment described hereinabove, the coil spring 26 is used as the urging mechanism. However, instead of the coil spring, there may be used, for example, another urging mechanism to which a columnar rubber having a different elastic force is connected so as to reduce the increase rate of the urging force at the initial stroke, which pushes the rod into the case, compared to the increase rate of the urging force at the later stroke following the initial stroke.

What is claimed is:

1. A push-up device, comprising:
   a case having a tube-shape and adapted to be fixed to an auto body side facing a fuel lid;
   a rod slidably held inside the case, and protruding from an inside of the case so as to push out the fuel lid;
   an urging mechanism positioned between the case and the rod, and compressed by an elastic deformation inside the case so as to urge the rod in a direction protruding from the inside of the case, the urging mechanism being a coil spring including a large pitch portion and a small pitch portion, which have different pitches; and
   a lock mechanism positioned between the case and the rod, and holding the rod against an urging force of the urging mechanism so as to lock the rod in a retracted position of the case,
   wherein the urging mechanism has an increase rate of the urging force at an initial stroke, which pushes the rod into the case, less than an increase rate of the urging force at a later stroke following the initial stroke,
   when the rod is to be locked, the rod is pressed to enter into the case while passing the initial stroke and entering into the later stroke so that the rod is rocked by the lock mechanism,
   the lock mechanism locks the rod in the retracted position of the case in a state wherein the small pitch portion is compressed leaving an unlocking push-in amount of the rod, and
   in a condition where the rod is rocked, the coil spring has the unlocking push-in amount so that when the rod is further pushed for the unlocking push-in amount, the rod is released from the lock mechanism.

2. A push-up device according to claim 1, wherein the small pitch portion is formed in two end portions of the coil spring in a longitudinal direction.

3. A push-up device according to claim 2, wherein the small pitch portions at the two end portions have same lengths, and the large pitch portion has a length such that the length of the large pitch portion is greater than the lengths of the small pitch portions.

4. A push-up device according to claim 3, wherein in the initial stroke, the large pitch portion is compressed, and the small pitch portions are compressed in the later stroke.

5. A combination comprising the push-up device according to claim 4 and the fuel lid, wherein in the initial stroke, the fuel lid is closed and the rod enters into the case to a position before locking, and in the later stroke, the rod advances further to be locked by the lock mechanism.

6. A push-up device according to claim 1, wherein the lock mechanism is a cam type lock mechanism in which a cam operates by pushing the rod in so as to switch between locking and unlocking.

7. A combination comprising the push-up device according to claim 1 and the fuel lid, wherein in the initial stroke, the fuel lid is closed and the rod enters into the case to a position before locking, and in the later stroke, the rod advances further to be locked by the lock mechanism.

* * * * *